(12) United States Patent
Meyer

(10) Patent No.: US 11,332,055 B2
(45) Date of Patent: May 17, 2022

(54) PRE-TENSIONING DEVICE AND METHOD FOR PRE-TENSIONING A BACKREST AND VEHICLE

(71) Applicant: Ford Global Technologies, LLC, Dearborn, MI (US)

(72) Inventor: Sebastian Meyer, Monheim am Rhein (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/089,790

(22) Filed: Nov. 5, 2020

(65) Prior Publication Data

US 2021/0155131 A1 May 27, 2021

(30) Foreign Application Priority Data

Nov. 21, 2019 (DE) .......................... 102019131536.0

(51) Int. Cl.
*B60N 2/70* (2006.01)
*B60N 2/64* (2006.01)

(52) U.S. Cl.
CPC ............. *B60N 2/7094* (2013.01); *B60N 2/64* (2013.01)

(58) Field of Classification Search
CPC ................................. B60N 2/7094; B60N 2/64
See application file for complete search history.

(56) References Cited

U.S. PATENT DOCUMENTS

| 8,544,929 B2 | 10/2013 | Brown |
| 9,145,071 B2 | 9/2015 | Bohm et al. |
| 2016/0159181 A1* | 6/2016 | Hahn ............................. 267/40 |

FOREIGN PATENT DOCUMENTS

| DE | 102009023014 A1 | 12/2010 |
| FR | 3028464 B1 | 4/2018 |
| JP | 2008279882 A * | 11/2008 |
| KR | 100529183 B1 | 11/2005 |
| KR | 202015000010 U | 1/2015 |

* cited by examiner

*Primary Examiner* — Anthony D Barfield
(74) *Attorney, Agent, or Firm* — Vichit Chea; Price Heneveld LLP

(57) ABSTRACT

A pre-tensioning device for pre-tensioning a backrest of a vehicle rear seat is provided. The backrest is situated in an upright seating position and configured to be pivotable about a pivot axis that extends in a vehicle transverse direction, in the direction of a folded position which in relation to the seating position is disposed to be repositioned toward the front. In order for a pre-tensioning device which can be produced in a more cost-effective and light-weight manner and can be attached in a more durable manner to be provided, the pre-tensioning device has at least one leaf spring which is configured to be supported at least indirectly on a vehicle body, and is supported at least indirectly on the rear side of the backrest that faces away from a passenger cabin.

12 Claims, 1 Drawing Sheet

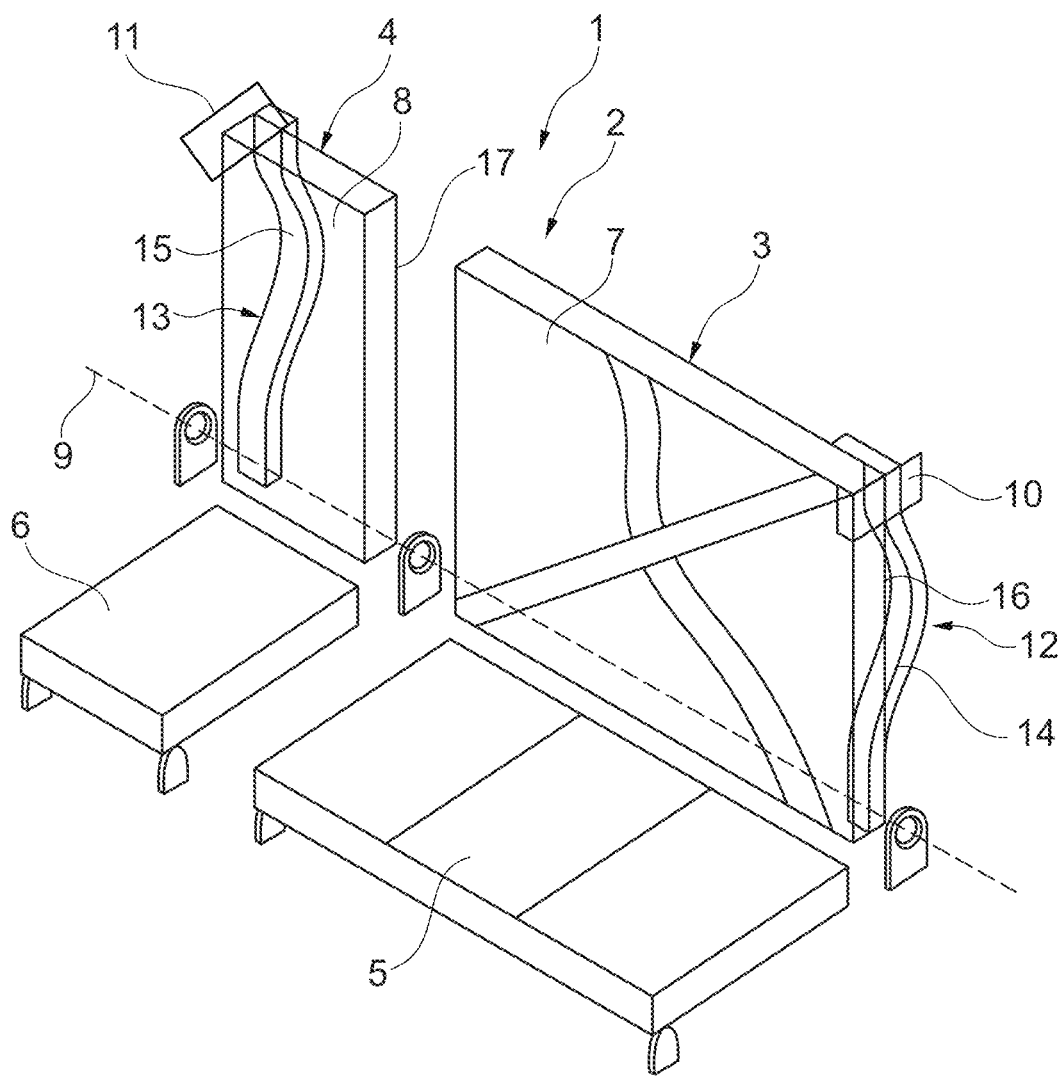

PRE-TENSIONING DEVICE AND METHOD FOR PRE-TENSIONING A BACKREST AND VEHICLE

CROSS-REFERENCE TO RELATED APPLICATION

This application claims foreign priority benefits under 35 U.S.C. § 119(a)-(d) to German Application No. 102019131536.0 filed Nov. 21, 2019, which is hereby incorporated by reference in its entirety.

FIELD OF THE DISCLOSURE

The present invention generally relates to a pre-tensioning device and to a method for pre-tensioning a backrest of a vehicle rear seat, and more particularly relates to pre-tensioning a backrest situated in an upright seating position and disposed to be pivotable about a pivot axis that runs in a vehicle transverse direction, in the direction of a folded position which in relation to the seating position is disposed to be repositioned toward the front.

BACKGROUND OF THE DISCLOSURE

Foldable rear seat structures of vehicles are increasingly remotely activated to be able to be moved out of the locked seating positions of the rear seat structures. A locking unit used for locking a rear seat structure in the seating position can be released by using a Bowden cable, for example, or electromechanically. The Bowden cable, or an electromechanical installation, respectively, can be activated or actuated, respectively, by way of an activation unit which is disposed in the trunk at the rear, for example. This moreover typically requires a spring element which, once the locking mechanism of the backrest has been released, urges the backrest to a folded position which in relation to the seating position is disposed to be repositioned toward the front, and pre-tensions the backrest situated in the seating position in the direction of the folded position.

The spring element for pre-tensioning the backrest is typically a torsion spring. Such a spring element is able to be connected to the rear seat structure and/or the vehicle body by way of an attachment, which can be complicated in terms of construction, and additional components such as, for instance, mountings or the like. This may result in higher costs and greater weight. Moreover, metal-to-metal connections which may require cost-intensive countermeasures in order to avoid disadvantages are often present in the attachments.

Many rear seat structures nowadays are already produced from a plastic material or a fiber-composite material. Heavy stresses are absorbed by a fiber reinforcement of plastic-material parts with long or continuous glass fibers. Plastic-material designs permit a high level of integration of functionality and offer a high degree of design freedom in terms of the design of attachments and functions.

U.S. Pat. No. 8,544,929 B2 discloses a foldable rear seat bench for a vehicle. A seatback element of the rear seat bench that is able to be established in a seated position and in a released state is able to be moved to a folded-forward position is pre-tensioned in the direction of the folded-forward position by use of a compressed coil spring.

U.S. Pat. No. 9,145,071 B2 discloses a vehicle seat having a basic structure which is to be connected to the vehicle structure, and a backrest which uses a kinematic mechanism is movable relative to the basic structure to transfer the vehicle seat from at least one use position which is able to be used for seating purposes to a non-use position or to a further use position. A multiple joint which controls the kinematics is present. Provided is a leaf spring which in the relaxed stretched position thereof forms a transmission member of the multiple joint.

KR 10 0529183 B1 discloses a rear seat for a vehicle having an adjustable backrest, wherein a shelf which is situated behind the backrest can be adapted to the respective position of the backrest in that a front portion of the shelf is pivotably disposed and by use of a leaf spring is pre-tensioned in the direction of the backrest.

DE 10 2009 023 014 A1 discloses a vehicle seat having at least one seat part, at least one backrest which is articulated on the seat part to be able to be folded by way of a pivot axis, and a locking device having a blocking feature and a closing bracket, and having a drive. Provided is a closing actuator which, with the aid of the drive, holds the blocking feature and the closing bracket to mutually engage in a clearance-free or almost clearance-free manner.

KR 20 2015 0000160 U discloses a vehicle seat having a seat part, a backrest which is articulated on the seat part so as to be able to be folded by way of a pivot axis, and a locking device for locking the backrest in a pivoted position.

FR 3 028 464 B1 discloses a device for adjusting the inclination of the backrest of a motor vehicle seat.

It would be desirable to provide for a pre-tensioning device which can be produced in a cost-effective and light-weight manner and is able to be permanently attached.

SUMMARY OF THE DISCLOSURE

According to a first aspect of the present disclosure, a pre-tensioning device for pre-tensioning a backrest of a vehicle seat is provided. The backrest being situated in an upright seating position and configured to be pivotable about a pivot axis that extends in a vehicle transverse direction, in a direction of a folded position which in relation to the seating position is disposed to be repositioned forward. The pre-tensioning device comprises at least one leaf spring configured to be supported at least indirectly on a vehicle body and supported at least indirectly on a rear side of the backrest.

According to a second aspect of the present disclosure, a vehicle is provided. The vehicle includes at least one vehicle seat which has at least one backrest, which is configured to be pivotable about a pivot axis that extends in a vehicle transverse direction between an upright seating position and a folded position which in relation to the seating position is disposed to be repositioned forward and at least one pre-tensioning device for pre-tensioning the backrest situated in the seating position in a direction of the folded position. The pre-tensioning device includes at least one leaf spring configured to be supported at least indirectly on a vehicle body and supported at least indirectly on a rear side of the backrest.

According to a third embodiment of the present disclosure, a method for pre-tensioning a backrest of a vehicle seat is provided. The method includes the steps of providing the backrest being configured to be pivotable about a pivot axis that extends in a vehicle transverse direction, in a direction of a folded position which in relation to the seating position is disposed to be repositioned forward, and pre-tensioning the backrest in the direction of the folded position with at least one leaf spring.

These and other aspects, objects, and features of the present invention will be understood and appreciated by those skilled in the art upon studying the following specification, claims, and appended drawings.

BRIEF DESCRIPTION OF THE DRAWING

In the drawing:

FIG. 1 is a schematic and perspective illustration of an exemplary embodiment for a vehicle having a pre-tensioning device for pre-tensioning a backrest of a vehicle seat, according to one embodiment.

DETAILED DESCRIPTION OF THE PREFERRED EMBODIMENTS

FIG. 1 shows a schematic and perspective illustration of an exemplary embodiment of a seating arrangement in a vehicle 1, of which only a rear bench 2 which is divided in two parts and has a left vehicle rear seat 3 which forms about 60% of the width of the rear bench 2, and a right vehicle rear seat 4 which forms about 40% of the width of the rear bench 2 is shown. According to other seating arrangements, the vehicle rear bench can be divided in three parts, each part being ⅓, or in two parts, each part being ½. A single-part rear bench or any other apportionment is also conceivable. The vehicle 1 may be a motor vehicle, such as a wheeled car, truck, SUV, van or bus, for example, or may be other types of vehicles such as a boat, train, or plane, for example.

Each vehicle rear seat 3 or 4 has a seat element 5 or 6, respectively, and a backrest 7 or 8, respectively, which is disposed so as to be pivotable about a pivot axis 9 that extends in a vehicle transverse direction between the upright seating position shown and a folded position which is not shown and in relation to the seated position is disposed to be repositioned toward the front. Each backrest 7 or 8 in the seating position thereof is able to be established on a vehicle body (not shown) by use of one locking mechanism 10 or 11, respectively.

For each backrest 7 or 8, the vehicle 1 moreover has one pre-tensioning device 12 or 13 for pre-tensioning the respective backrest 7 or 8, situated in the seating position in the direction of the folded position.

Each pre-tensioning device 12 or 13, has a leaf spring 14 or 15, respectively, which is supported at least indirectly on a body portion (not shown) of the vehicle 1 that is disposed to the rear of the respective backrest 7 or 8, on the one hand, and is supported at least indirectly on a rear side 16 or 17, respectively, of the respective backrest 7 or 8 that faces away from a passenger cabin (not shown), on the other hand.

Each leaf spring 14 or 15 is produced from a fiber-reinforced plastic material. The respective leaf spring 14 or 15 extends vertically across the entire height of the respective backrest 7 or 8, and by way of the end portions thereof is in each case supported at least indirectly on the rear side 16 or 17 of the respective backrest 7 or 8, and by way of a central portion which is disposed between the end portions is supported at least indirectly on the vehicle body.

When the locking mechanism is released, the respective backrest 7 or 8 folds to the folded position which is caused by the relaxation of the leaf spring. The respective leaf spring 14 or 15 is somewhat elongated herein, this however is negligible.

It is expedient for the leaf spring 14 or 15 in the relaxed state to be somewhat shorter than the extent of the backrest 7 or 8, respectively, such that the leaf spring 14 or 15, respectively, in the relaxed state does not protrude beyond the respective backrest 7 or 8.

The leaf spring 14 or 15 at an upper end, thus at a top end of the backrest 7 or 8, respectively, can also be mounted in a friction guide, thus in a compensation or friction bearing which is preferably disposed at an upper end, thus the top end of the backrest 7 or 8, respectively. At the opposite end, the leaf spring 14 or 15 can be fastened to a foot end of the backrest 7 or 8, respectively. The friction guide, or the compensation or friction bearing in the pre-tensioned state of the respective leaf spring 14 or 15 is able to be locked so as to be spaced apart from the top end, and is able to be released conjointly with a locking mechanism. The leaf spring 14 or 15 can thus relax along the friction guide.

The leaf spring 14 or 15 when transferring the backrest 7 or 8, respectively, from the folded position to the seating position, is pre-tensioned in that the friction guide is urged in the direction of the locking position thereof, wherein the end of the leaf spring 14 or 15, respectively, that is supported on the friction guide is entrained. The respective leaf spring 14 or 15 is pre-tensioned in the locking position of the friction guide.

It should be appreciated that the features as well as measures listed individually in the description herein can be combined with one another in any technically expedient manner and demonstrate further design embodiments of the pre-tensioning device. The description additionally characterizes and specifies the pre-tensioning device in particular in conjunction with the FIGURE.

According to the disclosure, at least one leaf spring is used for pre-tensioning the backrest situated in the seating position in the direction of the folded position. The leaf spring of the pre-tensioning device which is installed in a vehicle, in particular a motor vehicle, is supported directly, or by way of at least one further component indirectly, on a vehicle body, on the one hand, and directly, or by way of at least one further component indirectly, on the rear side of the backrest, on the other hand. The leaf spring herein is supported on the vehicle body and the backrest in such a manner that the leaf spring in the case of a backrest situated in the seating position is elastically deformed while generating a restoring force. The backrest by way of this restoring force is pre-tensioned in the direction of the folded position.

The leaf spring can be partially or completely produced from one or more plastic materials. Alternatively, the leaf spring can be formed from a metal element encased with a plastic material, for example a curved metal bar or curved metal spring plate. On account of plastic material being used for the external shape of the leaf spring, the latter can visually be adapted in a simple manner to components of the backrest and/or of the remaining part of the vehicle that are installed in the environment of the leaf spring such that it is not necessary for the leaf spring to be cladded by additional components. This may advantageously result in cost savings and weight reduction. Rather, the leaf spring can remain visible without compromising the visual appearance of the vehicle interior space. Moreover, the leaf spring is of simple configuration in comparison to a torsion spring, for example, and has a simple functional mode such that no further components are required for attaching the leaf spring to further components, such as is required by a torsion spring, for example. The leaf spring can in particular be integrally configured, this simplifying the complexity in terms of assembly. The leaf spring can be a separate component, or be a component which is integrated in a seatback structure, for example a seatback cladding (seatback trim, hard trim). The pre-tensioning device according to various embodiments can also have two, or a plurality of, leaf springs which are disposed in parallel.

Compensating for an elongation of the leaf spring when transferring the backrest to the seated position can take place by way of at least one compensation bearing, in particular a friction bearing, between the leaf spring and the backrest or the vehicle body and/or by way of the leaf spring per se. For example, if the leaf spring has a meandering profile, the leaf spring on account of the compensation can elastically deform along a vehicle vertical axis (Z-axis), for example, and/or a vehicle transverse axis (Y-axis). This elastic deformation of the leaf spring can however be very minor since the effect of the leaf spring is required only in a very small angular range, specifically only in the angular range which can be delimited by a backrest contact angle, the backrest pivoted from the folded position in the direction of the seating position upon reaching the backrest contact angle coming in contact with a locking mechanism which locks the seating position, on the one hand, and by a backrest seating angle in which the backrest is situated in the seating position, on the other hand.

The leaf spring moreover has the advantage that the leaf spring in the case of the backrest situated in the seating position and locked in this position reduces or entirely prevents rattling noises which could be created in a travelling operation of the vehicle on account of a clearance between the backrest, on the one hand, and the locking mechanism used for locking the backrest in the seating position and/or another vehicle component which is disposed to be adjacent to the backrest, on the other hand.

According to one advantageous design embodiment, the leaf spring extends vertically across more than half a height of the backrest and by way of the end portions of the leaf spring is supported at least indirectly on the rear side of the backrest and by way of a central portion which is disposed between the end portions is able to be supported at least indirectly on the vehicle body. The leaf spring herein can be configured to be curved in an arcuate manner, for example. The leaf spring can also extend across the entire height of the backrest. The leaf spring in the relaxed state at the top end, thus by way of an upper end, does however not protrude beyond the top end of the backrest. The pre-tensioning device can have at least one fastening element which is disposed on the central portion of the leaf spring and by way of which the leaf spring can be established on the vehicle body without restricting the elastic deformation capability of the leaf spring. The fastening element is releasable conjointly with the locking mechanism mentioned below.

One further advantageous design embodiment provides that the leaf spring is produced from a fiber-reinforced plastic material. On account thereof, the leaf spring can be produced at a lower weight and more cost-effectively than a corresponding component from metal, or than a conventional metallic torsion spring. Moreover, the leaf spring can be connected to further components by way of at least one plastic-to-metal attachment and/or at least one plastic-to-plastic attachment, on account of which metal-to-metal attachments which are conventionally required are avoided, this increasing the durability of the connection of the leaf spring to the further components.

A vehicle is configured having the pre-tensioning device being configured according to one of the above-mentioned design embodiments or a combination of at least two of these design embodiments, wherein the leaf spring is supported at least indirectly on a body portion of the vehicle that is disposed to the rear of the backrest.

The advantages mentioned with reference to the pre-tensioning device are associated in analogous manner with the vehicle. The vehicle can be a motor vehicle, for example, in particular a passenger motor vehicle. An access to an interior region which is present to the rear of the backrest can be released by pivoting the backrest to the folded position. The vehicle rear seat can be part of a rear bench of the vehicle. In the case of the backrest being situated in the folded position, the vehicle rear seat can moreover be repositionable in a linear manner in the vehicle longitudinal direction. The rear bench can also have two or a plurality of vehicle rear seats, the backrests thereof being able to be folded in a mutually independent manner.

The backrest in the seating position, in which the backrest, conjointly with a seat part of the vehicle rear seat, enables a person to be seated on the vehicle rear seat, is established by use of at least one locking mechanism which has at least one locking element which is fastened at least indirectly to the vehicle body, and at least one further locking element which in a locked state of the locking mechanism interacts with this locking element and is fastened at least indirectly to the backrest. The backrest is thus held in the seating position and the pre-tensioning of the leaf spring is maintained until the locking mechanism is released. The locking mechanism can be configured so as to be able to be manually activated, to which end at least one activation element can be disposed on the backrest, the locking mechanism being able to be released by manually activating the at least one activation element. The activation element can be, for example, a lever, a tape, in particular a strap, or the like. Alternatively, the locking mechanism is able to be remotely activated, for example by at least one Bowden cable, or an activatable electromechanical installation. The remote activation can take place from a trunk at the rear of the vehicle, for example.

A method for pre-tensioning a backrest is provided, according to which the backrest is pre-tensioned in the direction of the folded position by use of at least one leaf spring. The advantages mentioned above with reference to the pre-tensioning device are associated in analogous manner with the method.

According to one advantageous design embodiment, the backrest is pre-tensioned in the direction of the folded position by use of at least one leaf spring from fiber-reinforced plastic material. The advantages mentioned above with reference to the corresponding design embodiment of the pre-tensioning device are associated in analogous manner with this design embodiment.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat having a pre-tensioning device for pre-tensioning a backrest of the vehicle seat, the backrest being situated in an upright seating position and configured to be pivotable about a pivot axis that extends in a vehicle transverse direction, in a direction of a folded position which in relation to the seating position is disposed to be repositioned forward, the pre-tensioning device comprising:

at least one leaf spring configured to be supported at least indirectly on a vehicle body and supported at least indirectly on a rear side of the backrest, wherein the at least one leaf spring extends vertically across more than half a height of the backrest and is supported by end portions at least indirectly on the rear side of the backrest and is disposed via a central portion between the end portions and configured to be supported at least indirectly on the vehicle body.

2. The vehicle seat having a pre-tensioning device according to claim 1, wherein the at least one leaf spring is made from a fiber-reinforced plastic material.

3. The vehicle seat having a pre-tensioning device according to claim 1, wherein the vehicle seat is a vehicle rear seat.

4. The vehicle seat having a pre-tensioning device according to claim 1, wherein the rear side of the backrest faces away from a passenger cabin.

5. A vehicle comprising:
at least one vehicle seat which has at least one backrest, which is configured to be pivotable about a pivot axis that extends in a vehicle transverse direction between an upright seating position and a folded position which in relation to the seating position is disposed to be repositioned forward; and
at least one pre-tensioning device for pre-tensioning the backrest situated in the seating position in a direction of the folded position, wherein the pre-tensioning device comprises:
at least one leaf spring configured to be supported at least indirectly on a vehicle body and supported at least indirectly on a rear side of the backrest, wherein the at least one leaf spring extends vertically across more than half a height of the backrest and is supported by end portions at least indirectly on the rear side of the backrest and is disposed via a central portion between the end portions and configured to be supported at least indirectly on the vehicle body.

6. The vehicle according to claim 5, wherein the at least one leaf spring is made from a fiber-reinforced plastic material.

7. The vehicle according to claim 5, wherein the vehicle seat is a vehicle rear seat.

8. The vehicle according to claim 5, wherein the rear side of the backrest faces away from a passenger cabin.

9. A method for pre-tensioning a backrest of a vehicle seat comprising:
providing the backrest being configured to be pivotable about a pivot axis that extends in a vehicle transverse direction, in a direction of a folded position which in relation to the seating position is disposed to be repositioned forward;
pre-tensioning the backrest in the direction of the folded position with at least one leaf spring; and
supporting the at least one leaf spring which is configured to be supported at least indirectly on a vehicle body and at least indirectly on a rear side of the backrest that faces away from a passenger cabin, such that the at least one leaf spring extends vertically across more than half a height of the backrest and is supported by end portions at least indirectly on the rear side of the backrest and is disposed via a central portion between the end portions and configured to be supported at least indirectly on the vehicle body.

10. The method according to claim 9, wherein the backrest is pre-tensioned in the direction of the folded position with the at least one leaf spring from a fiber-reinforced plastic material.

11. The method according to claim 9, wherein the at least one leaf spring is made from a fiber-reinforced plastic material.

12. The method according to claim 9, wherein the vehicle seat is a vehicle rear seat.

* * * * *